(12) United States Patent
Chopard et al.

(10) Patent No.: US 11,408,685 B2
(45) Date of Patent: Aug. 9, 2022

(54) BLOCK AND UNIT FOR STORING THERMAL ENERGY

(71) Applicant: Hutchinson, Paris (FR)

(72) Inventors: Fabrice Chopard, Paris (FR); Paul Bline, Paris (FR); Boris Chauvet, Paris (FR); Christophe Dominiak, Paris (FR)

(73) Assignee: Hutchinson, Paris (FR)

( * ) Notice: Subject to any disclaimer, the term of this patent is extended or adjusted under 35 U.S.C. 154(b) by 263 days.

(21) Appl. No.: 15/753,884

(22) PCT Filed: Aug. 19, 2016

(86) PCT No.: PCT/FR2016/052101
§ 371 (c)(1),
(2) Date: Feb. 20, 2018

(87) PCT Pub. No.: WO2017/029464
PCT Pub. Date: Feb. 23, 2017

(65) Prior Publication Data
US 2019/0011197 A1 Jan. 10, 2019

(30) Foreign Application Priority Data

Aug. 20, 2015 (FR) ...................................... 1557830

(51) Int. Cl.
*F28D 20/02* (2006.01)
*F28D 20/00* (2006.01)

(52) U.S. Cl.
CPC ......... *F28D 20/026* (2013.01); *F28D 20/021* (2013.01); *F28D 20/025* (2013.01);
(Continued)

(58) Field of Classification Search
CPC .... F28D 20/026; F28D 20/021; F28D 20/025; F28D 2020/0082; F28D 2020/0021; Y02E 60/145
(Continued)

(56) References Cited

U.S. PATENT DOCUMENTS 2,525,261 A * 10/1950 Henderson ................ F25D 3/00
221/150 R
3,389,534 A * 6/1968 Pendleton ............... B65B 55/20
53/550

(Continued)

FOREIGN PATENT DOCUMENTS

DE 299 14 113 U1 10/1999
JP 7-229690 A 8/1995
WO WO 2012/112050 A1 8/2012

*Primary Examiner* — Ljiljana V. Ciric
(74) *Attorney, Agent, or Firm* — Blank Rome LLP (57) ABSTRACT

A modular block for storing thermal energy having a bottom wall and lateral walls defining a chamber. The lateral walls are made from a mouldable material. First thermal management elements are disposed in the chamber, which has at least one communication passage to the outside environment to allow a refrigerating fluid or a heat-transfer fluid a in heat exchange relationship with the first thermal management elements to pass into and out of the chamber. The modular block has second thermal management elements arranged laterally around the lateral walls or included in the mouldable material of the lateral walls for the thermal management of the chamber. The first thermal management elements are separated from the second thermal management elements by a part of the mouldable material of the lateral walls.

5 Claims, 10 Drawing Sheets

(52) U.S. Cl.
CPC ............... *F28D 2020/0021* (2013.01); *F28D 2020/0082* (2013.01); *Y02E 60/14* (2013.01)

(58) Field of Classification Search
USPC .................................................. 165/9.4, 10
See application file for complete search history.

(56) References Cited

U.S. PATENT DOCUMENTS

| | | | | |
|---|---|---|---|---|
| 3,456,452 A * | 7/1969 | Hilbert | | F25D 17/02 62/59 |
| 3,596,034 A * | 7/1971 | Mekjean | | F24H 7/0433 219/628 |
| 4,131,158 A * | 12/1978 | Abhat | | C09K 5/063 126/400 |
| 4,203,489 A * | 5/1980 | Swiadek | | F28D 20/0034 126/400 |
| 4,223,043 A * | 9/1980 | Johnson | | A23G 9/221 206/820 |
| 4,234,782 A * | 11/1980 | Barabas | | F24H 7/0416 392/345 |
| 4,280,483 A * | 7/1981 | Schaffer | | F24S 20/66 126/618 |
| 4,403,644 A * | 9/1983 | Hebert | | F24D 11/0257 165/10 |
| 4,445,566 A * | 5/1984 | Laing | | F28D 9/04 165/10 |
| 4,504,402 A * | 3/1985 | Chen | | C09K 5/063 252/70 |
| 4,505,953 A * | 3/1985 | Chen | | C09K 5/063 427/212 |
| 4,523,577 A * | 6/1985 | McClelland | | F24S 60/00 126/633 |
| 4,524,756 A * | 6/1985 | Laverman | | F28D 20/0056 126/400 |
| 4,556,100 A * | 12/1985 | Whitman | | F28D 20/02 126/619 |
| 4,565,242 A * | 1/1986 | Yano | | F28D 20/023 165/10 |
| 4,580,547 A * | 4/1986 | Kapralis | | A61F 7/03 126/263.03 |
| 4,580,571 A * | 4/1986 | McClelland | | F24S 20/61 126/633 |
| 4,753,080 A * | 6/1988 | Jones | | F25B 13/00 62/435 |
| 4,768,579 A * | 9/1988 | Patry | | F25D 3/00 165/10 |
| 4,924,935 A * | 5/1990 | Van Winckel | | F28D 20/02 165/10 |
| 4,931,333 A * | 6/1990 | Henry | | B65D 81/03 206/584 |
| 5,086,493 A | 2/1992 | Steffes | | |
| 5,165,466 A * | 11/1992 | Arbabian | | F24D 11/00 165/10 |
| 5,339,653 A * | 8/1994 | DeGregoria | | A62B 9/003 165/10 |
| 5,513,696 A * | 5/1996 | Baer | | G05D 23/01 165/10 |
| 5,853,045 A * | 12/1998 | Patry | | F28D 20/023 165/10 |
| 5,915,461 A * | 6/1999 | Tanhehco | | A61F 7/03 126/204 |
| 6,170,268 B1 * | 1/2001 | Elfert | | F25D 13/067 62/320 |
| 6,185,742 B1 * | 2/2001 | Doherty | | A41D 13/0053 165/136 |
| 6,645,598 B2 * | 11/2003 | Aiderman | | B29C 65/18 428/69 |
| 7,324,340 B2 * | 1/2008 | Xiong | | G06F 1/1616 361/700 |
| 7,905,110 B2 * | 3/2011 | Reich | | F28D 20/0034 126/400 |
| 8,771,331 B2 * | 7/2014 | Geibel | | A61F 7/02 607/112 |
| 9,598,857 B2 * | 3/2017 | Smith | | E04B 1/806 |
| 9,726,438 B2 * | 8/2017 | Smith | | F28D 20/023 |
| 9,756,955 B2 * | 9/2017 | Alder | | A47C 27/087 |
| 9,849,405 B2 * | 12/2017 | Smith | | B32B 5/02 |
| 10,487,496 B2 * | 11/2019 | Aiderman | | E04B 1/7662 |
| 10,604,326 B2 * | 3/2020 | Longley | | B65D 81/38 |
| 10,744,276 B2 * | 8/2020 | Robson | | A61M 5/44 |
| 11,054,191 B2 * | 7/2021 | Chopard | | F28D 20/023 |
| 2003/0124277 A1 * | 7/2003 | Agarwal | | A61F 7/02 428/35.2 |
| 2004/0191301 A1 * | 9/2004 | Van Duren | | A61K 9/7084 424/449 |
| 2005/0247430 A1 * | 11/2005 | Gast | | F28D 20/00 165/10 |
| 2007/0209365 A1 * | 9/2007 | Hamer | | C09K 5/00 60/648 |
| 2009/0250189 A1 * | 10/2009 | Soukhojak | | C09K 5/063 165/10 |
| 2011/0030915 A1 | 2/2011 | Best | | |
| 2011/0146939 A1 * | 6/2011 | Bond | | F25B 30/04 165/10 |
| 2013/0180683 A1 * | 7/2013 | Khan | | F28D 20/02 165/46 |
| 2014/0014290 A1 * | 1/2014 | Howes | | F28D 19/00 165/10 |
| 2014/0366536 A1 * | 12/2014 | Muren | | F03G 6/00 60/641.8 |
| 2015/0114591 A1 * | 4/2015 | Howes | | F28D 17/02 165/10 |
| 2015/0135732 A1 * | 5/2015 | Pourrahimi | | F25D 17/02 62/51.1 |
| 2015/0159959 A1 * | 6/2015 | Petrovic | | F28D 20/0056 126/620 |
| 2015/0233648 A1 * | 8/2015 | Goseling | | F25D 3/005 165/10 |
| 2015/0241137 A1 * | 8/2015 | France | | F28D 20/021 126/619 |
| 2015/0292771 A1 * | 10/2015 | Varga | | F24S 90/00 126/620 |
| 2016/0201996 A1 * | 7/2016 | Conry | | C09K 5/063 165/10 |
| 2018/0093816 A1 * | 4/2018 | Longley | | F28D 20/02 |
| 2021/0207895 A1 * | 7/2021 | Bissell | | F28D 20/0039 |
| 2021/0262228 A1 * | 8/2021 | Sawafta | | E04C 2/523 |

\* cited by examiner

BLOCK AND UNIT FOR STORING THERMAL ENERGY

The present invention relates to:
a block for a unit of (at least) one storage of a thermal energy,
and a unit for storing and releasing said energy.

Also, are concerned the storage and thermal management of a fluid circulation loop, wherein circulates a refrigerating or heat-transfer fluid.

Devices have already been proposed for providing functions for storing thermal energy.

US 2011/0030915 thus discloses such a device including:
elements for storing and releasing thermal energy,
a chamber for receiving said elements, the chamber being defined within outer walls joined by a bottom closing the chamber,
at least one communication passage between the outside and the chamber, to allow in and out of said chamber a refrigerating or heat-transfer fluid to be placed in the chamber in heat exchange relationship with said elements,
peripheral elements, at least some of which include at least one layer of a thermally insulating material and others at least one layer of a phase change material (PCM), and which are arranged around the chamber.

A twofold problem further arises related to the industrial production and the operational efficiency of said devices.

However, the industry is invited to accelerate the placing on the market of new technologies that may reduce the pollutant emissions, smooth any occasional increases in loads in relation to a nominal dimensioning operation, but also propose solutions to stagger over time the release of energy available at another time.

On an engine, or in a vehicle, the performance and the substantial reduction in dimensions and/or weight of both a clean system for containing a hot fluid and a system for cooling said engine and/or certain components of the vehicle, have appeared here as major passages to favour the achievement of the objectives currently displayed, in connection with the fuel consumption and the reduction of gaseous pollutant emissions.

It is in this context, and to answer at least part of these requests, that ere is proposed a modular block for the storage and release of energy, the block including, in addition to the aforementioned characteristics of the device according to US 2011/0030915, with a chamber open on a side other than that of the bottom, for example for placing therein or removing therefrom said elements for storing and releasing thermal energy, an embodiment:
wherein said peripheral elements are elements for the thermal management of the chambers which, without contact with any refrigerating or heat-transfer fluid, work thermally according to said exchanges made in the chambers, which is not the case of the tubes 2b in US 2011/0030915, and wherein said at least one layer of thermal insulating material is arranged in pockets which are under controlled atmosphere and have flexible sheets or metal walls (manually deformable under ambient pressure).

Thus, a modular design will be associated with a possible mass production and energy performance that test results have shown.

It is specified that a phase change material—or PCM—will designate any material capable of changing physical state. The thermal storage can be achieved by using the Latent Heat (LH) thereof: the material can then store or transfer energy by simple change of state, while maintaining a temperature and a substantially constant pressure, that of the change of state.

By "VIP constitution", it is understood a structure under controlled atmosphere containing at least one thermally insulating material a priori porous.

Under "controlled atmosphere" means filled with a gas having a thermal conductivity lower than that of the ambient air (26 mW/m·K) or "under partial vacuum", i.e. under a pressure lower than the ambient pressure (therefore<$10^5$ Pa). A pressure between $10^0$ Pa and $10^4$ Pa in the enclosure may also be suitable.

And "Porous" designates a material having interstices enabling the passage of air. The porous materials, with open cells, therefore include foams but also fibrous materials (such as glass wool or rock wool). The passage interstices that can be qualified as pores have sizes less than 1 or 2 mm so as to be able to guarantee a good thermal insulation, and preferably at 1 micron, and preferentially further at $10^{-9}$ m, for questions in particular of resistance to ageing and therefore possible lower negative pressure in the VIP envelope.

To promote said role of thermal management of the chambers, it is proposed that at least some of the pockets under controlled atmosphere containing at least one said layer of thermally insulating material are integrated into (with) the outer walls, or are arranged around said outer walls, being therefore preferably retained by a peripheral envelope that surrounds them.

To further promote the possible mass production, the assembly of the block, the maintenance thereof, and the operational efficiency thereof, it is proposed that the aforementioned block further comprises a sealing surface (thus with a seal) surrounding the open side of the chamber, for providing sealing in relation to the fluid.

For similar reasons, it is also proposed that the PCM is received in at least one cavity of said outer walls, and/or that said PCM(s) is(are) arranged in said pockets, with the thermally insulating material(s).

It is also proposed that the block includes a series of said pockets joined by flexible intermediate portions between two successive pockets where same can articulate in relation to one another, and which may also be under controlled atmosphere, typically via a single peripheral seal which will mean that the pockets and said intermediate portions will communicate in the sealed envelope which will then surround same.

Thus, it will facilitate the industrialisation, supply, implementation, adaptation to various forms of blocks and the maintenance of the thermal management on the periphery of the block.

For comparable considerations, it is proposed that said intermediate portions include at least one structure of thermal insulating material, flexible (or deformable) and under said controlled atmosphere, thus providing a continuity of thermal insulation between two pockets.

In this way, possible articulation and thermal performance will be combined.

Figure 1:
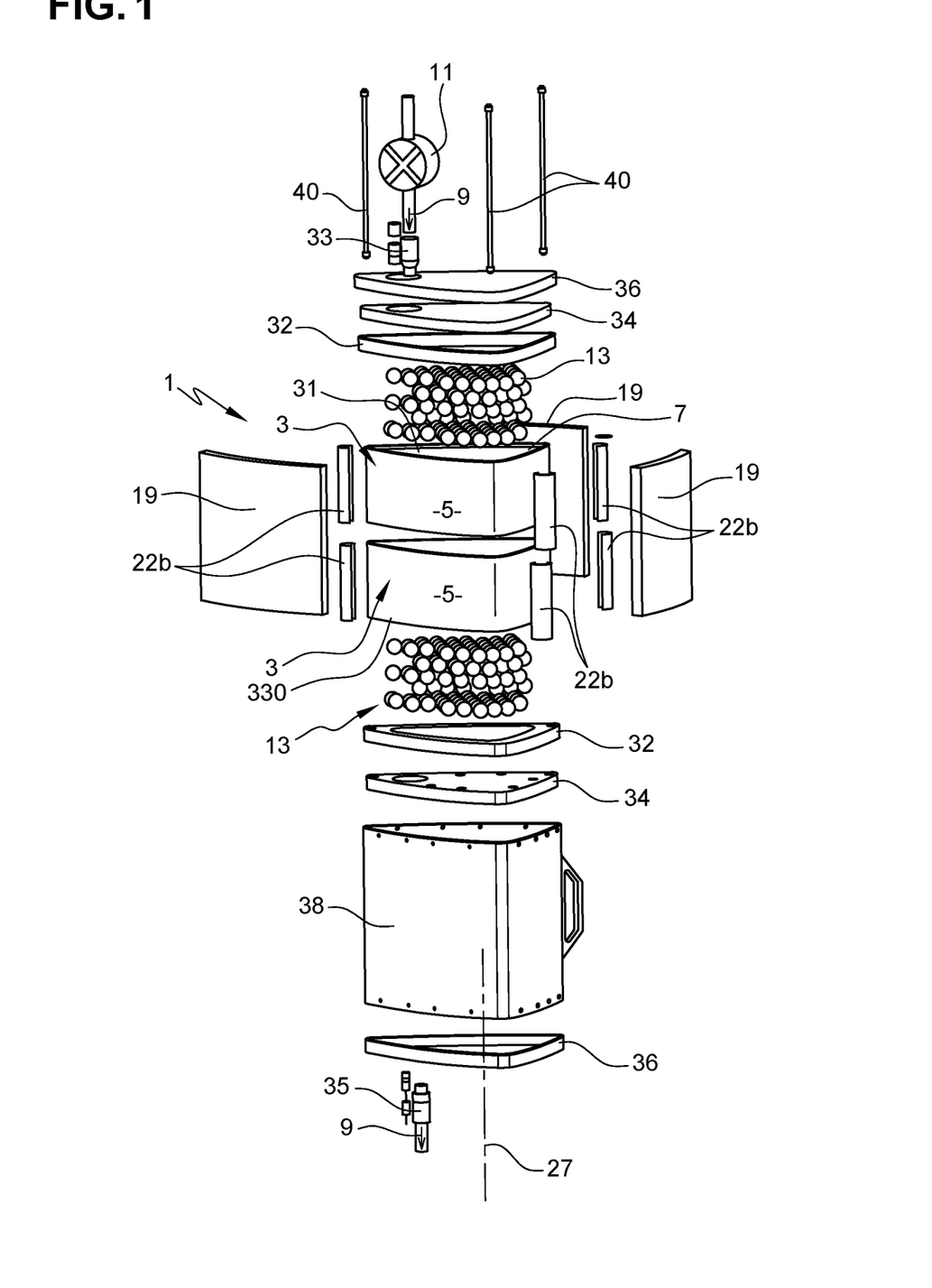
FIG. 1 illustrates a storer/exchanger unit, with an alternative FIG. 15.
Figure 2:
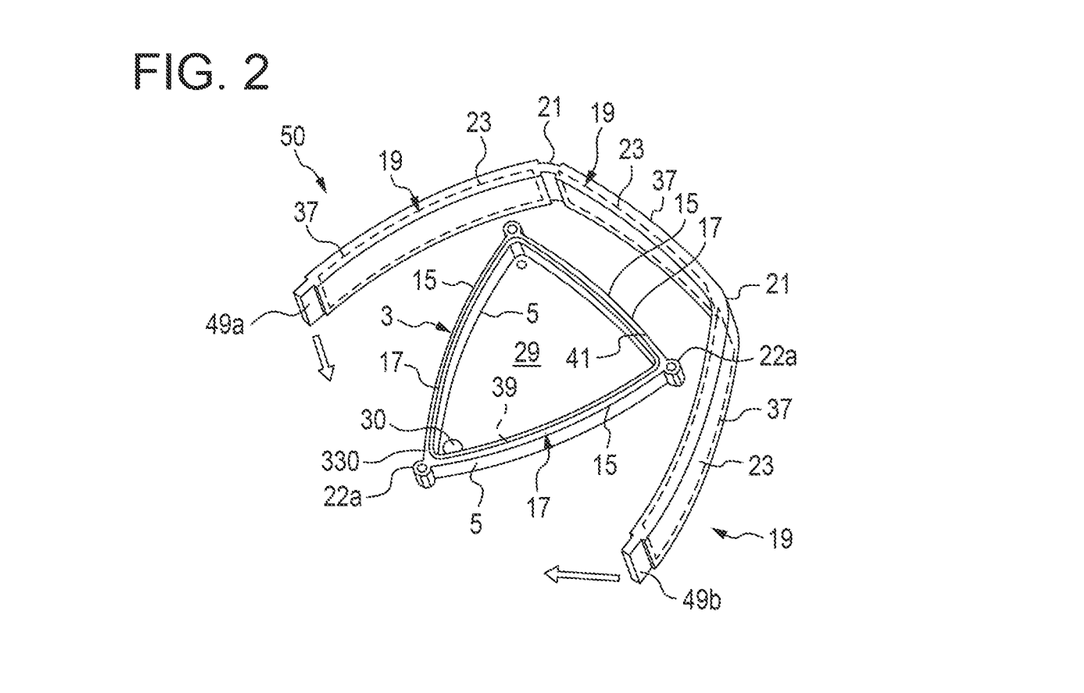
FIGS. 2, 3 show a module of the unit, in two possible embodiments, exploded.
Figure 3:
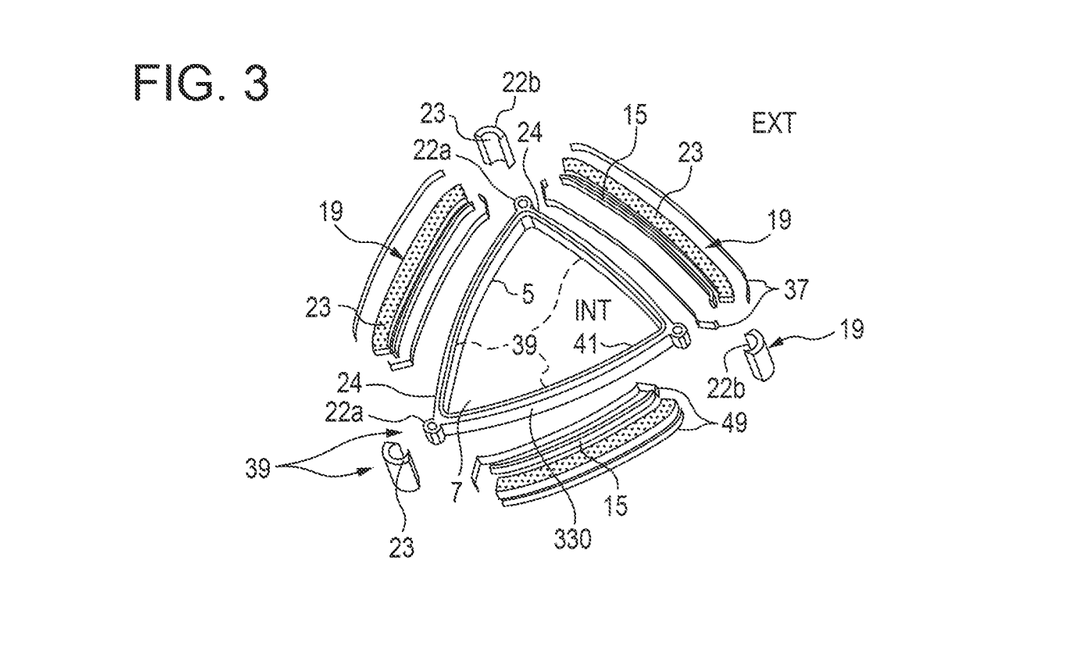

Concerning now the actual storage and release unit, for the aforementioned reasons, it is recommended to have:
a plurality of stacked modular blocks, each including:
  elements for storing and releasing said thermal energy including at least one PCM,
  a body comprising:
    a chamber for receiving elements for storing and releasing said thermal energy, the receiving chamber being defined within outer walls of the body joined by a bottom closing on one side the chamber, which is open on the other side for placing therein or removing therefrom said elements for storing and releasing said thermal energy, at least one communication passage between the chambers, to allow in and out a refrigerating or heat-transfer fluid to be placed in the chamber in heat exchange relationship with said elements, preferably a sealing surface surrounding the open side of the chamber, for providing sealing in relation to the fluid (bonding or welding would make it possible to dispense with seals), attachment means suitable for attaching together the blocks, and elements for the thermal management of the chambers arranged around said chambers and at least some of which include at least one layer of a thermally insulating material (preferably porous and integrated into a vacuum insulation panel; VIP) and others at least one layer of a PCM and wherein:

said at least one layer of thermally insulating material is arranged in pockets under controlled atmosphere and with flexible sheets, said pockets insulating the chambers individually (block by block, as shown in FIG. 2 or 3) or globally (as shown in FIG. 1).

Integrating the pockets of PCM type into the outer walls will make it possible to provide a production by moulding, with bodies made of polymer, increased standardisation and ease and safety of implementation. An arrangement outside, on the periphery, will enable adaptation to certain dimensions, or even to constraints of installation.

The reference to a wall or a body made of mouldable material covers both injected and fibre-filled thermoplastic resins and thermosetting resins impregnating a fabric or a mat, such as a woven or a non-woven.

Tie rods or bonds or welds may be suitable for axially connecting together the modular blocks.

One consideration was also to promote the circulation of the fluid as well as the heat exchanges in each block.

It is also proposed that a plurality of modular blocks are stacked along an axis, and that each block includes a communication passage passing through the bottom of the chamber thereof, to allow the fluid to circulate from one chamber to another, two successive passages being offset from one passage to the next parallel to said axis, to define baffles.

An advantage of the modular solution presented here is to be able to adapt the relative positions of the blocks in order to best satisfy the context. Thus, it is possible that it was necessary to arrange two adjacent blocks with the chambers thereof face to face or back to back, for example.

It is also expected from the solution a modularity making it possible to adapt to the requirements of each case of implementation, a high energy performance, a possible mass production, and a cost price compatible with such a production adapted to the automotive field.

In this regard, it is recommended that the body of each modular block is unitary.

And to promote the circulation of the fluid in operational situation, it is provided that the unit further includes means for placing in circulation the fluid so that it circulates (in a forced manner) in the chambers and in a circuit external to said blocks.

Again, to perfect the thermal insulation and further promote the mass production, it is moreover proposed that at least some of the thermal management elements including a PCM are arranged in said pockets with the thermally insulating material; this making it possible to provide an embodiment in the form of a VIP and/or a practical package, including if said envelope must be integrated into said outer walls of the bodies.

It is also proposed that the bodies are stacked together, so that externally said outer walls define supports against which are applied the VIP, which will be blocked laterally by protrusions, or spacers, that will maintain a space having substantially the thickness of said VIP, between the outer walls of the bodies and the outer envelope (which may be removable).

This will combine modularity/high energy performance/adaptability/ease of maintenance/mechanical structuring.

An ease of implementation and optimisation of exchange surfaces combined with an optimised thermal management may also be targeted.

It is thus proposed that the elements for storing and releasing the thermal energy, which are therefore individualised elements, such as balls or cartridges, are arranged loosely in the chambers, reserving between same circulation spaces for the fluid.

On the other hand, the PCM of the thermal management elements arranged around said chambers will favourably form one or more panels which will therefore work, without contact with any fluid, as a function of what will happen thermally in said chambers, there where the multiple individualised PCM elements will promote the residence time of the fluid.

Applying the functional module solution presented above will moreover have full meaning on a lubrication circuit of an engine defining a circulation path of a lubricant (typically oil) whereon are arranged, in fluid communication, functional components of the engine to be lubricated, a lubricant sump (even if the tank is elsewhere, as in a dry sump), said sump (crankcase) defining, or containing, a unit wherein at least one said modular block as aforementioned, each having all or some of the above presented characteristics.

In this context, it is even provided for a preferred application (because integrated) wherein:

said functional components of the engine will be located in an engine block, and the lubricant sump will be screwed to the engine block, below same, and lubricant may circulate therein to be heated or cooled via the characteristics of the said block (s) arranged there.

Providing a vehicle lubricant tank that can be used to heat the lubricant when the outside temperature is cold, for example 5 to 10° C., and when the vehicle is stopped at said temperature for, for example, 6 to 8 hours was a challenge.

To overcome same, it is proposed a lubricant sump:

either containing said block or defined by the aforementioned block with all or some of the characteristics thereof (wherein the outer walls of the block joined by said bottom are therefore same of said sump)

with, in both cases, the block which will thus contain said elements for storing and releasing thermal energy, to be placed in heat exchange relationship with lubricant to be circulated in said chamber via a pump.

In both cases, it will advantageously be provided that, circulation of the lubricant stopped, said elements for storing and releasing energy are immersed in a first volume of lubricant (V1) outside (typically above) of which will extend a second volume of lubricant (V2) lower than the first.

In this way, the first volume of lubricant (V1) being hotter than the second (V2), because the PCM(s) of said elements (hot at the end of the preceding operation of the engine block provided with said lubricant sump) will have heated same at the time of start of a new cycle (after the aforementioned stop due to cold weather), the total lubricant in circulation (V1+V2) will be rapidly globally hot, with advantages in terms of efficiency of the engine to be lubricated and limitation of pollutants.

In connection with the above is also concerned an assembly including an engine block to which the aforementioned lubricant sump will be screwed, below same and which will be in fluid communication therewith, for the circulation of the lubricant.

If necessary, the invention will be better understood and other characteristics, details and advantages thereof will further appear upon reading the following description given by way of non-limiting example and in reference to the appended drawings, wherein.

It must be considered that the examples of operational solutions presented hereafter and the versions illustrated may be combined with one another. Mixtures of solutions may thus be easily deduced therefrom, such as, for example, FIG. 2 an absence of protrusion 22a on a body 330, or an absence of connections 21 between the pockets 19.

The diagrams in the figures (in particular FIG. 1) therefore show all or part of a unit 1 for storing, and favourably subsequently releasing, thermal energy provided by a refrigerating or heat-transfer fluid 9.

Of modular construction, the unit 1 includes:
a plurality of structures or modules 3, each provided with a body 330 having a peripheral wall 5 and a bottom 29 surrounding an inner volume (or chamber) 7 where the refrigerating or heat-transfer fluid 9 is present, for having circulated in said volumes under the action of circulation means 11, and elements 13 for storing and restoring (subsequently) thermal energy,
at least one layer or element 15 containing a PCM that can be arranged in the peripheral wall 5 (for example, in at least one (quasi) peripheral cavity 17 of said wall, as shown in FIG. 2) or around said peripheral wall, in particular in the envelope(s) 37 in FIGS. 7, 8 in particular,
elements 19 with thermally insulating material 23 and preferably under controlled atmosphere arranged laterally around each volume 7, individually (FIG. 2) or in groups (FIG. 1).

The modules 3 are arranged along a stacking axis 27. And each bottom 29 is transverse to the peripheral wall 5 (by joining the sides) and here opposite, along the axis 27, to an opening 31 through which can be placed or removed from the corresponding volume 7 the elements 13 that may be balls or spheres.

Figure 16:
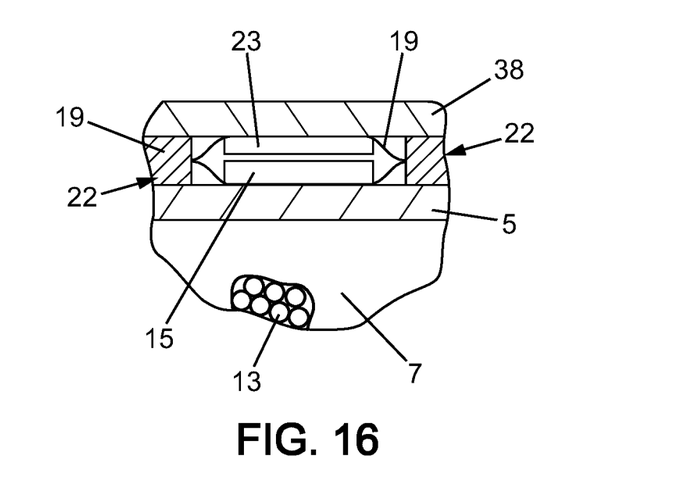
FIG. 16 shows spacers for installing said pockets and FIG. 17 a possible metal pocket.

As shown in FIG. 3 or 16, retaining protrusions 22 attached with the peripheral wall(s) 5 can be provided, in particular, in the angles of the outer walls forming the peripheral wall 5, two protrusions delimiting between same, laterally and around the peripheral wall, an open space 24 where is arranged at least one of the thermally insulating elements 19 under controlled atmosphere.

In this regard, the embodiment in FIG. 2 provides an alternative where the pockets 19 are still individual but are no longer independent from one another. This is a series of such pockets 19 of VIP constitution, i.e. under controlled atmosphere, joined by intermediate portions 21 where two successive pockets can be articulated with one another. Thus, two successive pockets 19 are spaced apart from one another by the corresponding intermediate portion 21, as illustrated.

Each pocket will contain at least one thermal insulating material 23, and will extend laterally (transversally to the axis 27) around a volume 7 (preferably all around), to thermally insulate same from the outside (EXT) with the content thereof, the layers 15/23 defining elements for the thermal management of the temperature in the volumes 7.

The, or each, layer 15 containing a PCM may be arranged in the quasi-perimetric cavities 17 of the wall 5 or all around said wall, in particular within the pockets 19.

In said solution with pockets 19 arranged laterally around the wall 5, a peripheral envelope (sleeve or sheath) 38 of mechanical protection open at both ends, for example made of hard plastic, envelops the modules 3, the parts 32, 34, 36 and the pockets 19, which are therefore interposed between the walls 5 and said sheath. Extending around the protrusions 22 and the thermally insulating elements under controlled atmosphere 19, the sleeve 38 participates in retaining the elements 19 in the spaces 24, as shown in FIG. 3.

The retaining protrusions 22 may be in a plurality of portions. Thus, in particular, it can be seen in FIG. 3 a solution wherein same are in two portions 22a, 22b. The portion 22b is removable and can be attached, by the engagements of forms with one another, with the portion 22a which is integral with the peripheral wall 5, in outer periphery thereof. The removable portions 22b may each be presented as a clip or an end piece to be engaged by forced elastic deformation, or by lateral sliding, around the fixed portion 22a. Said retaining portions 22b may be thermally insulating and contain for this a layer 23 made of thermally insulating material (which therefore may be under controlled atmosphere, such as a pocket 19).

Typically, the bodies 330 of the modules 3 will have angles and the retaining protrusions 22 will be like rods extending in the angles, as illustrated.

Unlike the above, rather than therefore be hollow such as a clip, the removable portion 22b could have a protrusion towards an outer hollow of the fixed portion 22a to engage therewith. Another possibility: the two portions 22a, 22b would only form one to define a protrusion integral with the wall 5.

The peripheral walls 5 and bottoms 29 of the modules or structures 3, which may be integral, may in particular be made of polyamide, of another rigid polymer (medium or high-density polyethylene, for example), or of composite (filled with fibres), or even of metal.

Passages 30 communicating at least two by two, in the bottoms 29, enable the fluid 9 (which may be water or oil, or even a gas, such as air), to circulate, from an inlet 33 to an outlet 35, between the modules or structures 3. Said fluid 9 will globally circulate along the axis 27.

Where this is necessary, since the open structures 3 can be arranged in particular back to back (FIG. 1) or conversely face to face, one or more covers 32, here two double, close the openings 31 of the end modules, so as to seal each volume 7. Externally, each cover 32 may be lined by a single pocket 34 under controlled atmosphere. And a mechanical protection plate 36 may close the whole, along the axis 27, as illustrated.

The inlet 33 and outlet 35, which pass through the portions 32, 34, 36 if same exist, to lead into the respective volumes 7, define connection elements as shown in FIG. 1.

Again, for the sealing in relation to the fluid 9, a first sealing surface 39 (that may be provided with a seal 41) surrounds the opening 31 of each chamber 3, which opening is therefore located transversally to the axis 27, opposite the bottom 29.

Attachment means 40, such as axial tie rods, will moreover be preferably provided to engage with the bodies of the modules 3 in order to provide an attachment between said bodies placed in contact and facing. After that, the sleeve 38 will be externally put in place.

The bodies 330 being attached together, along the axis 27 in the stacked arrangement considered, the first sealing surface 39 will therefore be pressed either against a second sealing surface defined externally at the location of the bottom 29 of an adjacent body, in a relative arrangement of the bodies back to back, or against the first sealing surface of such an adjacent body, in a relative arrangement of the bodies face to face. At least one seal (not shown) will be arranged on one side and/or the other.

In place of the tie rods and seals, it is possible to provide a welded or bonded solution of the modules together, along the axis 27.

It will be understood that the assembly 1 will be thermally efficient thanks to the PCM/thermal insulation compound that makes it possible to associate:
a thermal insulation of the modules in relation to the outside (EXT),
a retarding effect related to the changes of states of the PCM.

The thermally insulating material 23 may be a glass wool, a polyurethane or polyisocyanurate foam, or even more favourably a porous, or even nano-porous material, such as a silica or an organic aerogel or the pyrolate thereof impregnated in a porous network and arranged in a vacuum enclosure, to therefore define at least the vacuum insulation panel VIP already mentioned.

As a material 15, or constitution of elements 13 contained in each inner volume 7 and with which the fluid 9 is in heat exchange relationship, a rubber composition such as described in EP2690141 can be provided, namely a cross-linked composition based on at least one room temperature vulcanising "RTV" silicone elastomer and including at least one phase change material (PCM), said at least one silicone elastomer having a viscosity measured at 25° C. according to the standard ISO 3219 which is less than or equal to 5000 mPa·s. In said composition, the elastomer matrix will mainly consist (i.e. according to an amount greater than 50 phr, preferably greater than 75 phr) of one or more "RTV" silicone elastomers. Thus, said composition could have the elastomer matrix thereof including one or more silicone elastomers according to a total amount greater than 50 phr and optionally one or more other elastomers (i.e. other than "RTV" silicones) according to a total amount lower than 50 phr.

In particular, a material based on paraffin, eutectic fatty acid (myristic-capric) or eutectic hydrated salt (calcium chloride+potassium) could also be used as a constituent material, alone or not, of the aforementioned elements. Alternatively, the PCM of the elements cited could be based on fatty acid, paraffin, or eutectic or hydrated salt. In fact, the choice of the material and the packaging thereof in each element concerned, in particular the dispersion thereof within a polymer matrix, will depend on the intended application and the expected results.

A priori the elements 13, here individualised, such as the spheres mentioned, will be arranged loosely in the volumes 7. The size ratio of the individualised structures/dimensions of each sub-volume will therefore be defined accordingly, in order preferably to optimise the exchange surfaces of the elements 13/fluid 9.

Thus, the elements 13 of PCM type will not be tubes or, preferably, will be arranged in a patternless manner and not in an organised manner (as they are in US 2011/0030915), in order to promote the conditions of implementation (no storage) and the residence times of the fluid in the chambers, in exchange relationship with said elements 13, in particular promoting a circulation with many meanders due to the obstacles constituted by said elements 13 through the axial circulation 27 of the fluid.

Figure 11:
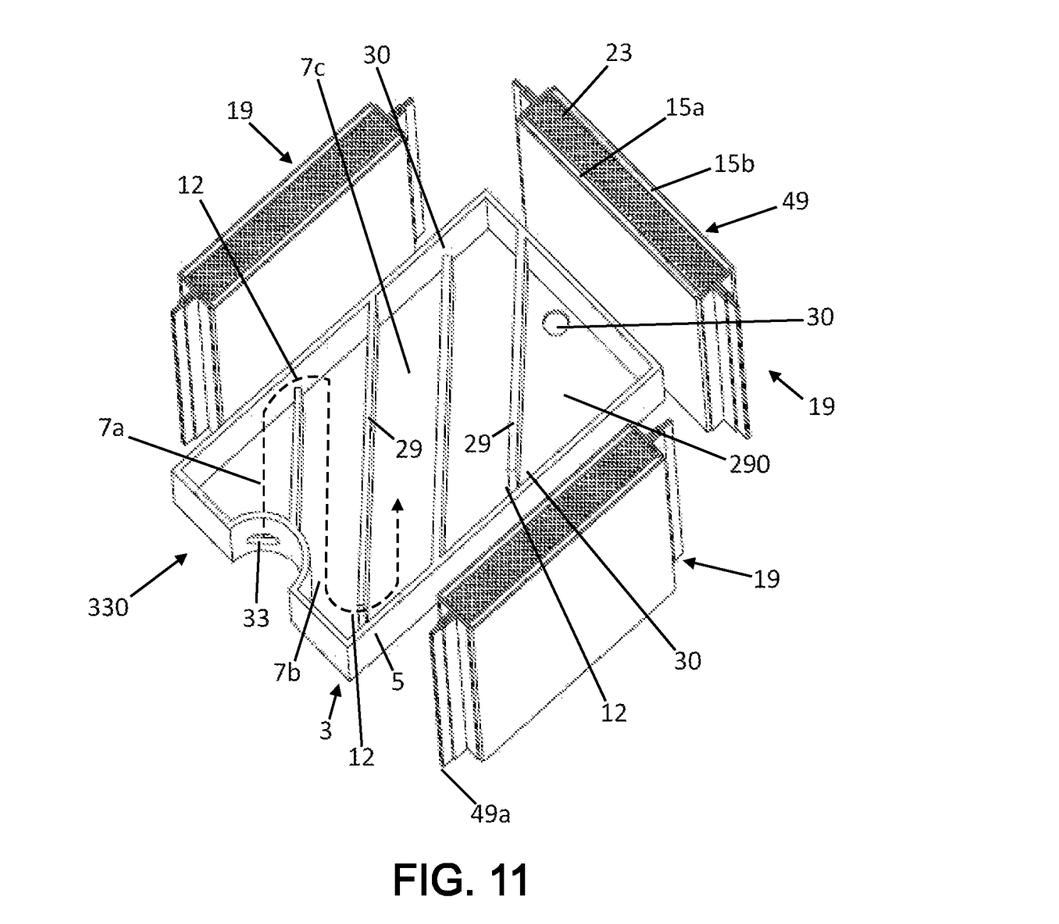

As it is important that the elements 13 of PCM type exchange broadly with the fluid 9, the PCM 15 of the thermal management elements (15, 19, 23) arranged around the chambers or volumes 7 must form one or more panels (structure peripherally continuous or not as shown in the figures, in particular 2, 3, 11) which without contact with any refrigerating or heat-transfer fluid, will work thermally according to said exchanges made in the chambers.

This is why the PCM 15 of the peripheral elements is called "thermal management": same participates in the thermal management of the chambers. This is not the case of the tubes 2b in US 2011/0030915.

Thus, peripherally arranged around the chambers or volumes 7, said material placed in the deformable or flexible envelopes thereof, such as 37, 51, will favourably form one or more walls or panels 19 for the thermal management.

Figure 4:
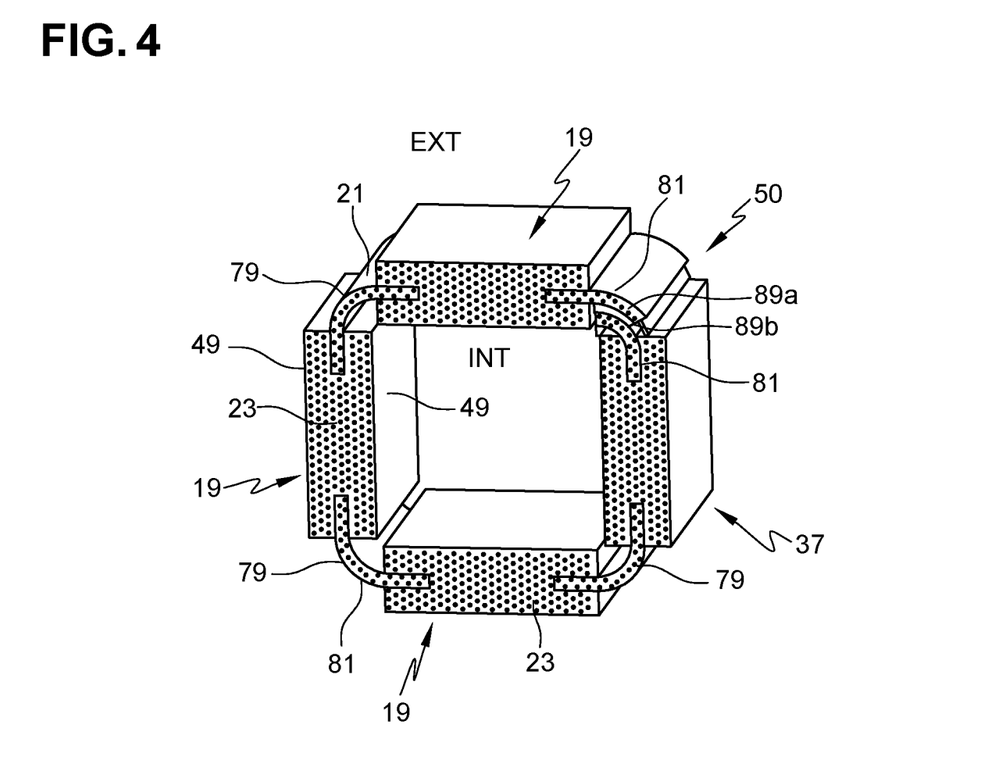
FIGS. 4 to 10 and 11 illustrate various embodiments of VIP, or mixed PCMNIP pockets, in section; it must be imagined that the strip continues laterally in FIGS. 6-8, as well as FIG. 10 with the lateral wall (5 hereafter), and that said pockets (with the connection areas 21 thereof, if they exist) are closed along the sides thereof (such as in areas 49a, 49b hereafter) to make the partial internal vacuum possible, FIG. 10 also illustrates an integration of such pockets and connection areas 21 into the thickness of said lateral wall 5, FIG. 11 also illustrates a module body with internal baffles.
Figure 5:
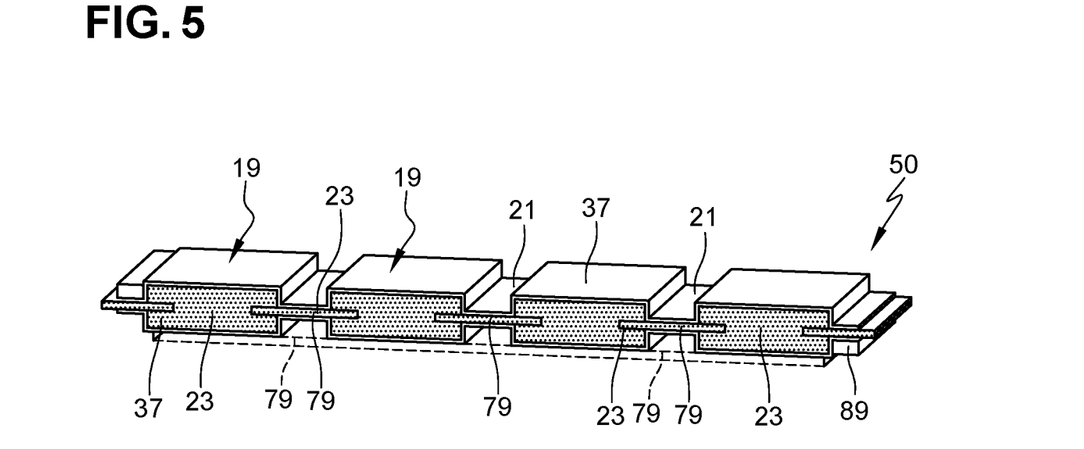
Figure 6:
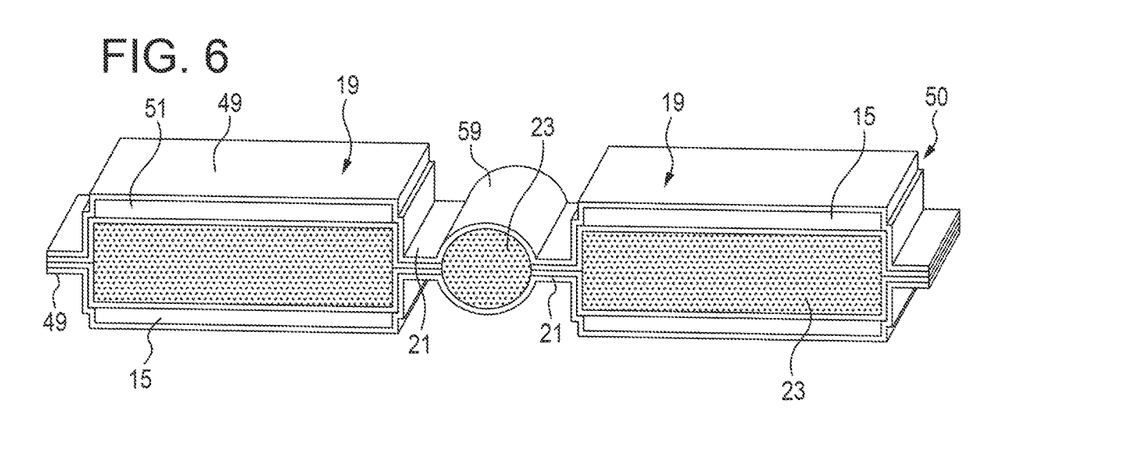

If the peripheral insulating pockets 19 follow one another continuously around a wall 5, and although this is not strictly imposed (a form closed thereon, as a sleeve being possible), it will a priori be preferred that the elements 19-21 define together an articulable panel 50 (as in FIGS. 2A-6) that can:
typically in an operational state, be closed thereon (FIG. 4, wherein the structure 50 is to be imagined to thus be arranged around a wall 5 to be insulated),
and be deployed substantially flat, for example to be stored and in a state that may be non operational (FIG. 5 or 6).

Independently of a discontinuous or not embodiment of the pockets 19, the following presents, in reference in particular to FIGS. 3 and 5-8, a favourable embodiment of said pockets and intermediate portions 21 if same exist. Thus, even if only one pocket 19 is shown, it is sufficient to reproduce the model then on either side to continue the structure, if desired.

Figure 7:
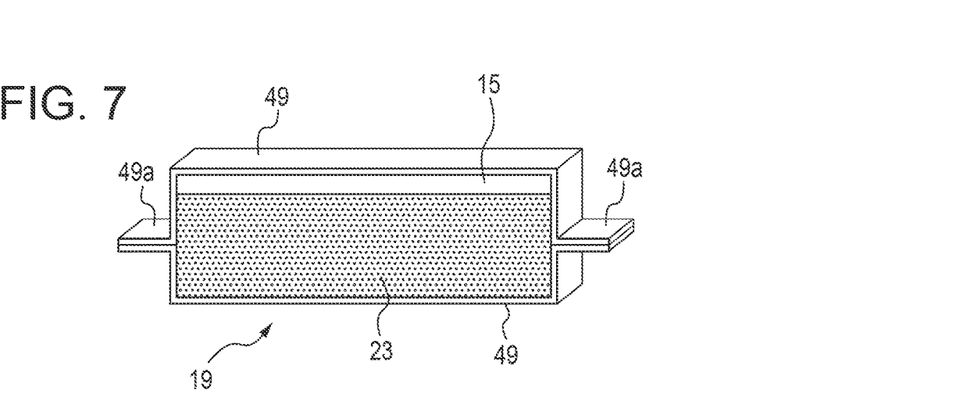
Figure 8:
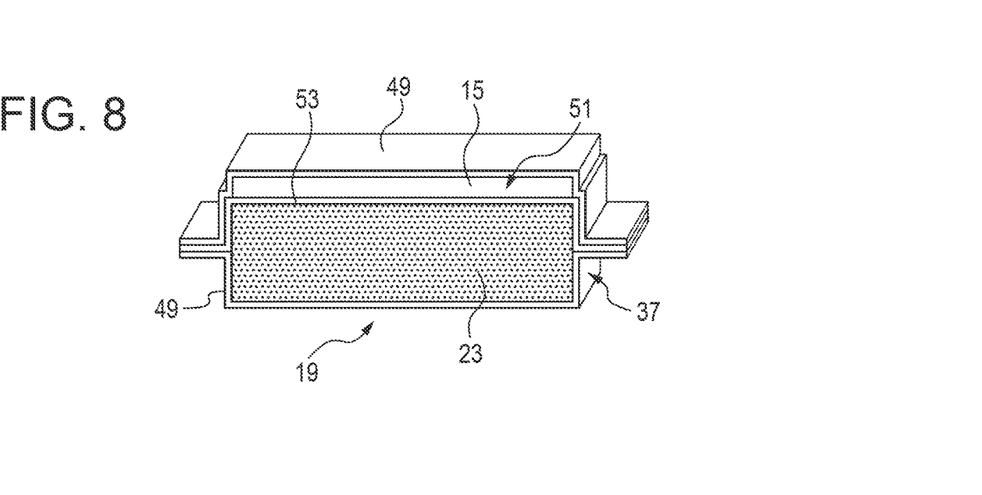

It can thus be seen that in both a continuous and discontinuous solution, each pocket 19 under controlled atmosphere can then include (as seen in exploded view in FIG. 3):
at least one first element, or one first layer 15 containing the PCM, beside (operationally outside) of which is arranged a second element consisting of said thermally insulating material 23, and
at least one closed outer envelope 37 which contains the first and second thermal management elements and consists of at least one flexible sheet 49 sealed to the PCM, with:
a) either said flexible sheet 49 that is furthermore sealable (thermally/chemically, in 49a, 49b around the pocket)

and impervious to the porous material 23 and to air (or even also to water), so that an air space prevailing in the envelope 37, a so-called vacuum insulation panel (VIP) is thus defined, as shown in FIG. 7, b) or the second thermal insulating element 23 contained within a second closed envelope 51 with flexible sheet 53 that is sealable and impervious to the porous material and to air (or event to water), so that an air space prevailing in the second envelope, a so-called vacuum insulation panel (VIP) is thus defined, as shown in FIG. 8.

It should be noted that two layers 15 (or 15a, 15b) containing one or more PCM could (as shown in FIG. 6 or 11) be arranged on either side of the layer of porous material 23, or even no such layer, if provided only in the wall 5, as shown in FIG. 2.

The porous thermal insulation 23 that could therefore be nanostructure, will therefore be confined in a flexible sheet 49 or 53 which will not allow water vapour or gases to pass through. The VIP obtained will be emptied of the air thereof to obtain, for example, a pressure of a few millibars, then may be sealed. Typically, the thermal conductivity A of such a VIP will be 0.004/0.008 W/m·K. The use of vacuum insulation panels should make it possible to achieve a thermal resistance R=5 m$^2$·K/W with only 20 mm of insulation.

A possible composition of the material 23 is the following: 80-85% of silica dioxide (SiO2), 15-20% of silicon carbide (SiC) and possibly 5% of other products (binder/fillers). A thickness of 0.4 to 3 cm is possible. Examples, that can be applied here, of VIP and super-insulating material are furthermore provided in PCT/FR2014/050267 and in WO2014060906 (porous material), respectively.

The solutions presented above must enable, in an acceptable volume and weight in particular by aeronautical or automobile manufacturers, rapid storage of an available thermal energy after approximately 6-10 minutes, the retention of said energy for 12 to 15 hours, before the rapid release thereof, typically a few minutes (in particular less than 2-3 minutes), for example to an engine during a cold start phase.

The flexible sheets 49, 53 of the VIP may typically be made in the form of a multilayer film comprising polymer films (PE and PET) and aluminium in, for example, laminated (sheet of thickness of around ten micrometres) or metallised (vacuum deposition of a film of a few tens of nanometres) form. The metallisation can be carried out on one face or on both faces of a PE film and a plurality of metallised PE films can be compounded to form a single film. Example of design of the film: —PE inner sealing, approximately 40 µm—Al vacuum metallisation, approx. 0.04 µm—PET outer layer, approximately 60 µm.

Figure 17:
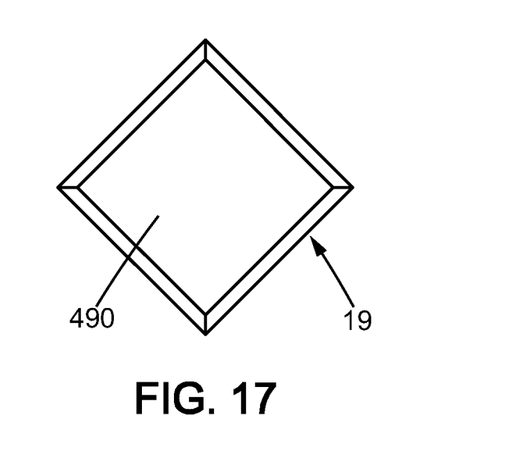

If the references 49 and/or 53 designate a wall(s) or metal plate(s), see also pocket 19 with metal walls 490 in FIG. 17, it will then be considered a wall thickness less than or equal to 3 mm, and typically thicknesses between 0.07 mm and 3 mm. It will then be possible to choose materials in the group including stainless steel, aluminium and other metals with a thermal conductivity lower than 300 W/m. K, thus making it possible:

to combine the global thermal conductivities of the part and intrinsic of the plates, because the thermal diffusion and the thermal losses will then be low, and to satisfy the mechanical resistance requirements comparable to those of 7 mm thick solid-wall oil sumps made of aluminium.

In case b) above where there is a double sheet: inner 53 and outer 49, the sheet 49 may, however, therefore only be a simple polymer film, such as a PE 0.05 to 0.2 mm thick, the object of this outer sheet 49 can then only be to create a simple bag for containing/joining together the elements or blankets 15 and 23.

Figure 10:
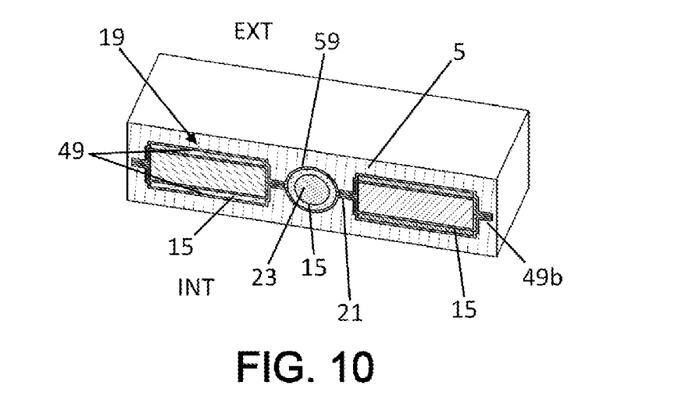

It should also be noted that the/each envelope 37, 51 may typically be formed of two sheets or walls arranged on either side of said material elements 15 and 23 and joined together, as in 49a, 49b in FIG. 2, 7 or 10 (only figures where said references are marked).

Figure 9:
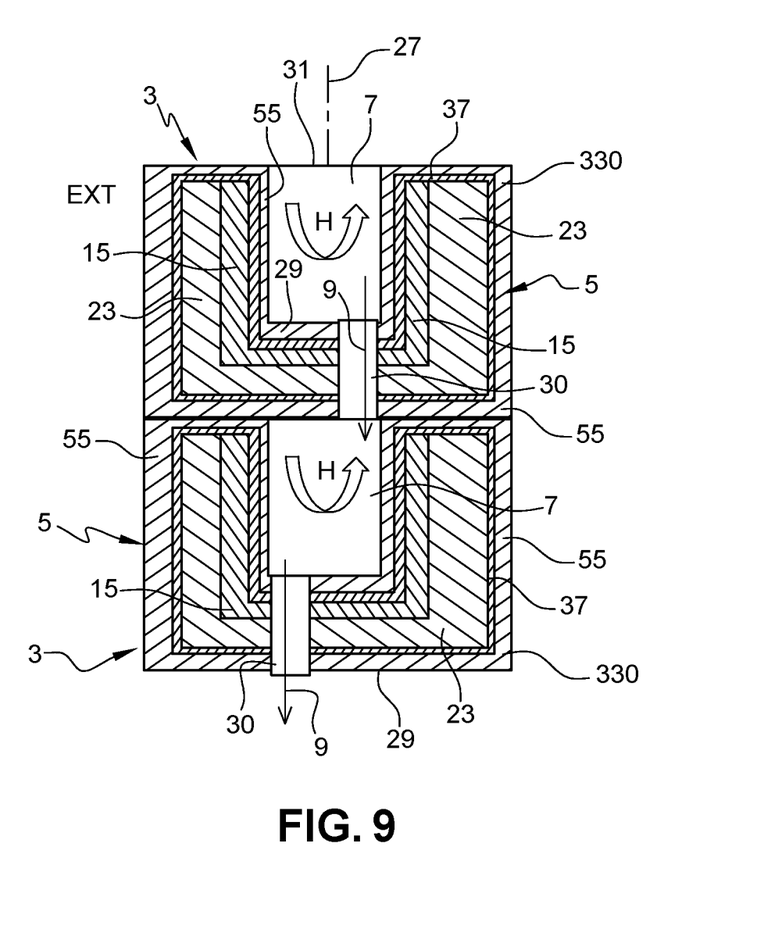

In any case, an advantage of said sheets directly in contact with one another at the location of the intermediate portions 21, as illustrated, if same are a plurality, (or of said sheet if same is unique) is that advantage can be taken of the physical continuous thereof at the location of said portions 21 to create therein an articulation area (however fixed if there is integration into the thickness of the wall 5, as in FIG. 9 or 10, without breaking the vacuum created by the VIP constitution.

However, the simple use of said flexible (or manually deformable) sheets or walls will create a discontinuity of thermal insulation between the two consecutive pockets 19 thus joined.

In some cases, the intermediate portions 21 could have significant surfaces that are all the more troublesome in terms of thermal bridges; but it may also be necessary to place a panel 50 or a sleeve 47 in support, for example to position same correctly in relation to the environment thereof.

All the more in these cases, there may be a benefit in defining a bulging portion 59 between two articulation areas 21 (each formed by the aforementioned flexible sheet(s) applied against one another), each area being itself joined laterally on one side to the pocket 19 concerned, this regularly or not in the chain, as shown in FIG. 6 or 10.

Each bulging portion 59 may contain a thermal insulation 23, for example as a blanket. It may, for example, be of flexible product, as a blanket, known as Spaceloft®, a SIAP (Super Insulation at Atmospheric Pressure) proposed by the company ISOLProducts with a thermal conductivity: λ=0.01 to 0.02 W/m·K. A PCM layer 15 (FIG. 10) may also be contained, each of said portions 59 being therefore favourably enveloped in the aforementioned flexible sheet(s) (to maintain a VIP constitution). Said bulging portions 59 will favourably have a convex outer surface, in particular enabling a support against concave supplementary outer surfaces.

Nevertheless, in said solution with bulging portion(s) 59, the intermediate portions 21 are not fully thermally insulating.

Also, it is proposed (as illustrated in FIG. 5) that the intermediate portions 21 are defined by at least one structure 79 of thermally insulating material 23 (preferably porous so as to be integrated into the overall VIP structure), providing a continuity of thermal insulation between said two pockets. The insulating material may be identical to the porous thermally insulating material of the pockets; likewise for same of the areas 59.

In the example of FIG. 5, the porous material (here in plate form) of each flexible structure 79 that extends along the thickness between the flexible sheet(s) 49 of the envelope 37, is interrupted in the porous thermally insulating material 23 which fills the pockets 19. However, there could be continuity, as illustrated by the continuous dots 79 the flexible structure of which that same illustrate would replace same discontinued illustrated.

Thicker than the impregnated fabrics and the portions 21, for example more than 2.5 to 3 times thicker, and for example formed in a block, as illustrated, the pockets 19 of thermally insulating material 23 will typically be stiffer than the flexible articulation structures 79.

The thermal insulation of the structure(s) 79 will typically be different than same of the pockets 19, for example of flexible type as a blanket (see hereafter).

So that the panel 50 thus formed acquires the VIP constitution thereof, under partial vacuum, of course such a vacuum will be created, with sealing, after the layers or plates of porous material 23, 81 have all been enveloped by the sealed flexible sheets 49.

To produce the structures 79, it will be possible in particular to use a flexible polymeric mesh support (for example an organic or inorganic woven or non-woven fabric, or a web) such as a polyester or a polyamide of a few mm thick impregnated with an aerogel 81, for example silica, or the pyrolysed version thereof (pyrolysed aerogel, it being specified that said pyrolysed alternative applies to each case of the present description wherein a porous thermally insulating material is concerned).

For information, an insulation structure presented above with VIP pockets 19 with for core material a nano-porous aerogel or the pyrolysed version thereof may have a thermal conductivity lower than 10 mW·m−1. K−1 for an internal pressure of 2 to 5 to $10^{-3}$ Pa. The negative pressure in the pockets, or even the portions 21, may be that usual of VIP: $10^{-3}$ to $10^{3}$ Pa.

In connection with, in particular FIGS. 6, 8, 10, it will further be noted, as already mentioned, that it may be advantageous that at least some of the pockets under controlled atmosphere and/or areas of intermediate portions contain at least one PCM, said material 15 being identical to or different from same of the elements 13 of PCM type.

If there are two layers of said material, the second layer will be, where the two layers exist, arranged around the first layer, with interposition of the material 23 between same and different change of state temperatures.

If there is only one layer of said material 15, it will therefore be favourably surrounded by the material layer 23, at the location of the pockets 19, and by the material 81 if the flexible intermediate portions 21 are provided. In several figures, INT the side of the volume 7 and EXT the (environment) outside have also been marked.

It should also be noted that the pockets 19 will not necessarily be strictly flat. Thus, a curve shape is possible, as shown in the example in FIG. 3.

As illustrated in FIGS. 9, 11, it will be further noted that, to promote the heat exchanges in the chambers 7, and therefore the efficiency of the unit 1, it will be preferred that baffles 12 are created in the unit 1, so that the fluid 9 circulating therein follows a path that will meander.

FIG. 11 makes it possible to understand that such baffles 12 may be formed by the fact that each transverse wall 29 and the through passage 30 thereof form a retarder to the free circulation of the fluid between the inlet 33 thereof and the outlet 35 thereof.

Preferably, as alternatives or complements to the walls 29, the passages 30 between the bodies will be favourably offset from one passage to the next, parallel to the axis 27, as illustrated in FIG. 9, for the baffling effect.

In the variant in FIG. 11, a single module 3 with a single body 330 was imagined, with, for example, a lateral inlet 33 through an area of the peripheral wall 5 thereof. The baffles 12 are (essentially) created here by the internal partitions 29 which, within the space 7 delimited by the peripheral wall 5 and the pierced bottom 290, split said space into sub-volumes 7a, . . . 7c.

Each partition 29 interrupting at one of the lateral ends thereof before reaching the wall 5, this is where each passage 30 is created which, in connection with the partition concerned and preferably an alternation in the lateral end thus open, forms a baffle. Arrived at the last sub-volume, the fluid leaves the body through the pierced bottom. Each sub-volume contains elements 13.

In both cases (FIGS. 9 and 11), the circulation of the fluid is therefore substantially following a succession of S (see arrow in FIG. 11).

FIG. 9 also makes it possible to reinforce the fact that at least some of the thermal management elements may, placed in the pockets 19 (not shown), be integrated into the outer walls 5 of the bodies (i.e. forming a single part therewith), even if the pockets are not shown in the figure; only are the layers 15 and 23, being also specified that one or more such pockets may or may not be arranged in the bottom 29.

Figure 12:
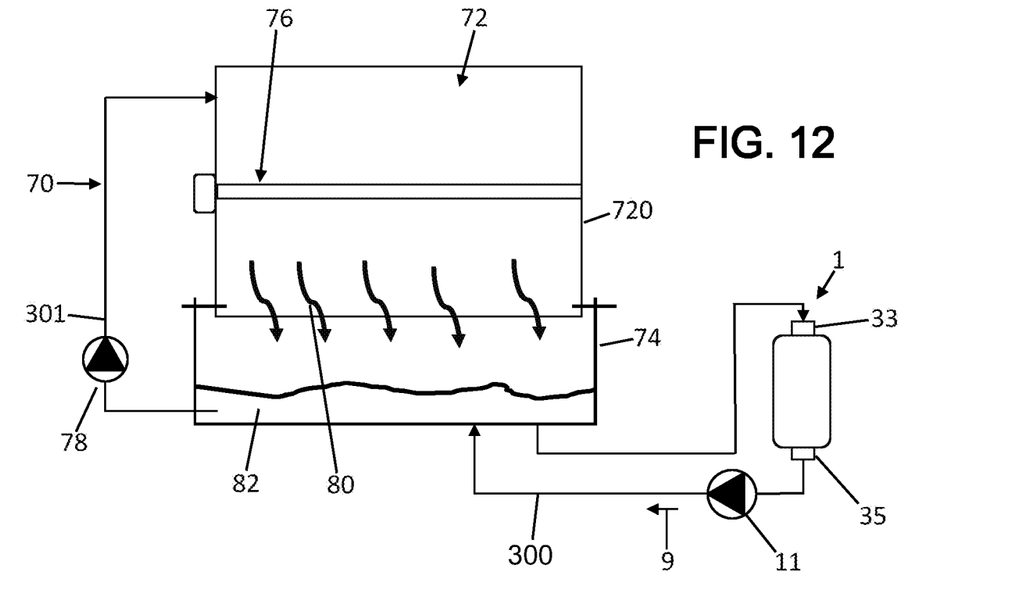
FIGS. 12-15 illustrate three assemblies, on an oil circuit.
Figure 13:
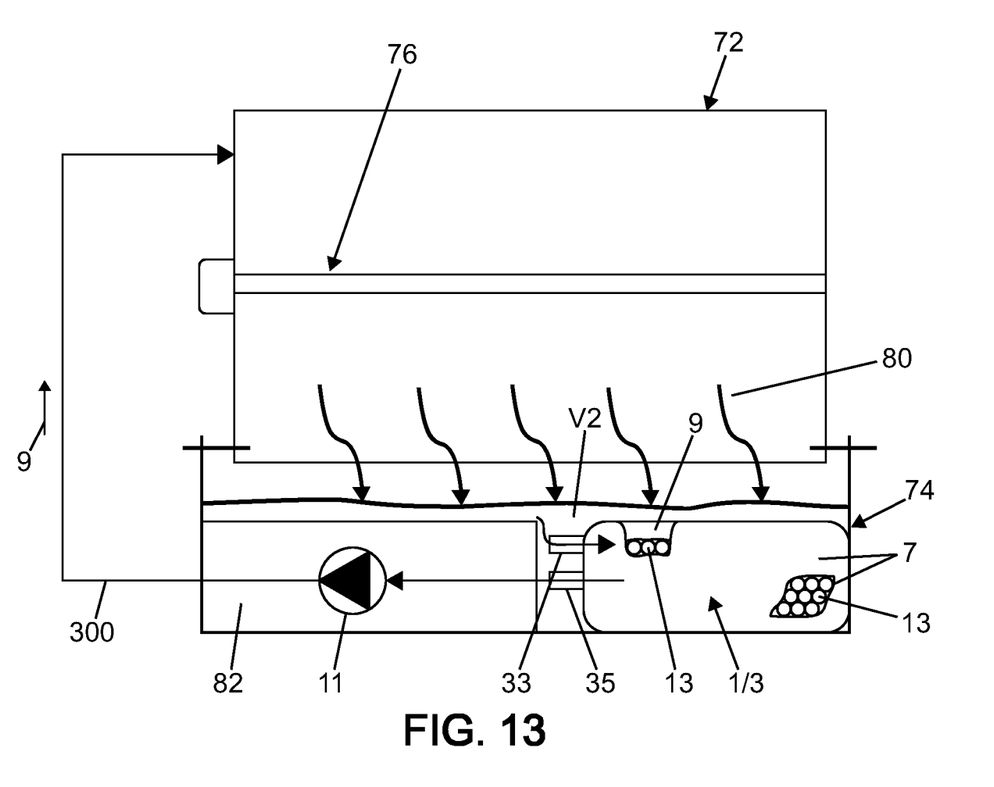

FIGS. 12, 13 show the operational use of at least one modular block 3 or a unit 1 with a plurality of blocks on the oil circuit 70 of an engine 72, it being specified that the use of said blocks or the unit on a water circuit (or liquid other than the oil) may also be interesting, for example on an engine cooling circuit, by coupling with a gas (e.g. air)/liquid (e.g. water) or liquid (e.g. fresh water)/liquid (e.g. seawater) exchanger.

The circuit 70 defines here an oil circulation path whereon are arranged, in fluid communication with one another, an oil sump 74 and functional components of the engine to be oiled, such as the bearings of connecting rods and of the crankshaft, but also of the camshaft and the driving device thereof, 76. The sump 74, the vessel (a priori metal) of which is screwed under the engine block 720, with a seal, contains the oil necessary for the lubrication of the moving parts of the lower engine and of the upper engine. The oil is drawn by the strainer of the oil pump 78 which distributes same under pressure, preferably via an oil filter, to the various components (crankshaft, connecting rods, camshaft, etc.). The oil can then go back down again by simple gravity; arrows 80. The sump is equipped at the lowest point thereof with a bleed screw with sealing washer, dedicated to the periodic oil change of the engine.

Three non-limiting assemblies are more specifically shown.

In the first, illustrated in FIG. 12, a unit 1, like same in FIG. 1, assembled, is connected via the connector 33, 35 to the branch 300 of the oil circuit 70 which communicates with the oil bath 82 of the sump 74. The pump 11 provides the circulation of oil in the unit and the branch 300. Thus, the oil bath 82 will be able to benefit from an oil at appropriate temperature, in particular avoiding a temperature that is too low in winter (favourable to a cold start). Another pump 78 takes oil from the bath to distribute same to the relevant components of the engine, via the branch 301 of the circuit 70. This solution can be adapted to a "dry sump" lubrication. The oil will then no longer be contained in the sump, but in an independent tank where it will be directly drawn, before passing into the unit 1, to then be transferred to the areas to be lubricated, the return being made directly into the tank.

Figure 14:
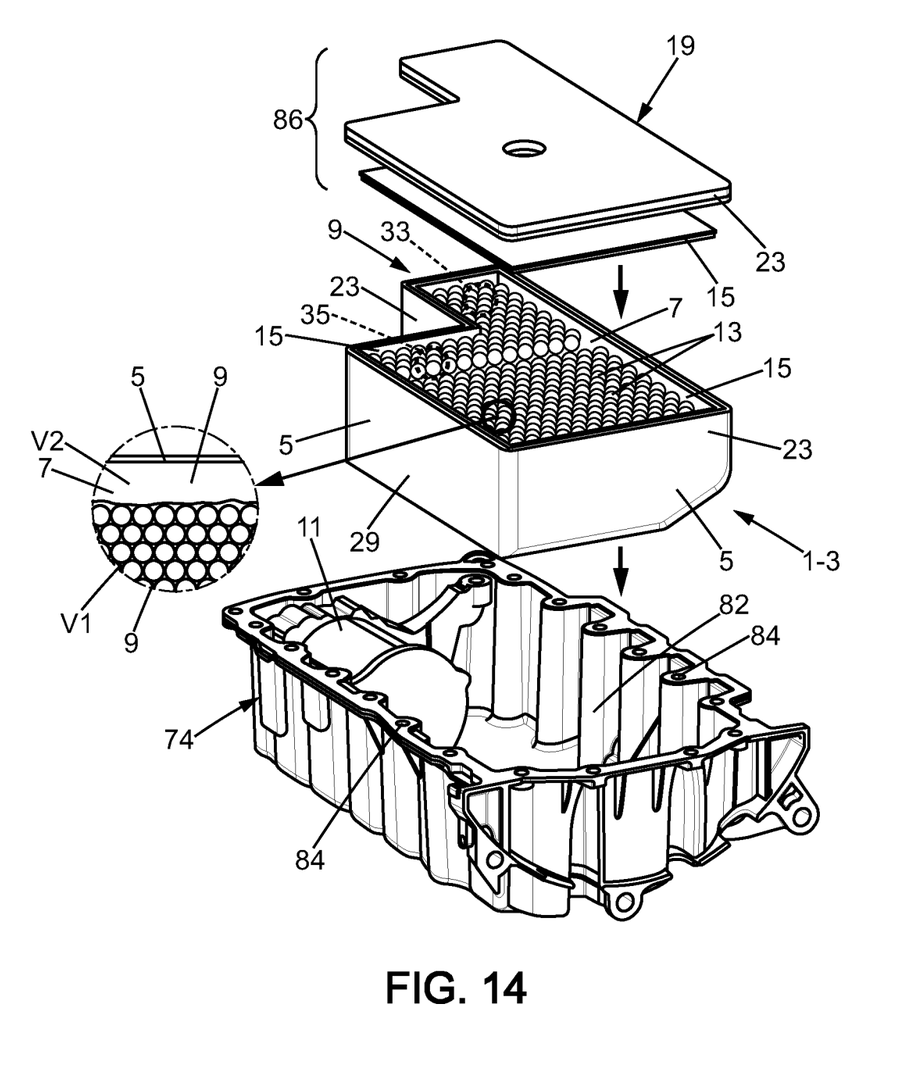

In the second assembly in FIGS. 13, 14, a unit 1 (which could still only include a block 3, like that in FIG. 14) is placed via the fluid inlet/outlet connection 33, 35 directly on the closed oil circuit 300 which passes through the aforementioned relevant components of the engine 72 and the sump 74. The pump 11 provides the circulation of oil in the unit 1 and the entire circuit 300. The unit 1 is arranged in the oil sump 74. The oil thus passes from the bath 82 into the unit 1 wherefrom it is taken to circulate towards said components to be oiled. Such an integration enables savings of space, or even of weight and efficiency (potentially less pressure loss and thermal protection that can further be increased by insulating the wall of the sump 74).

It will be understood that above the term "oil" is to be understood in the broad sense, as "a lubricating fluid for the engine". And it will also be noted that it is advantageous for the lubrication circuit 70 of the engine to therefore define a circulation path for the lubricating fluid whereon will be arranged the means (11 or 78) for circulating the lubricating fluid, the sump 74, functional components (such as 76) of the engine to be lubricated, to be placed in heat exchange relationship with the fluid 9 coming from the unit 1, and the unit 1 containing at least the volume 7:

which contains the elements 13 for storing and subsequent releasing thermal energy, of PCM type, placed in a heat exchange relationship with said lubricating fluid 9, and around which are therefore arranged at least the first and second layers 15, 23.

FIG. 14 shows the sump 74 in the internal volume 82 of which the pump 11 is located and where the block 3 is to be arranged, the chamber 7 of which is defined within the walls 5 and the bottom 29, with the fluid inlet/outlet connection 33, 35 to be connected directly on the closed oil circuit. The ports 84 of the sump enable the assembly thereof under the engine block.

In the storer-exchanger 1/3 of said embodiment, the volume 7 is devoid of baffles (no wall arranged through the volume, in particular). By circulating around and/or in the elements 13 of PCM type that occupy the main part of said volume 7, the lubricant will heat exchange with same.

Laterally all around, but also under same (wall 29) and above, via for example the cover 86, the volume 7 is surrounded by a thermal management compound with PCM layers 15/thermal insulation 23 and with pockets 19, which can be integrated with the walls or arranged in lining.

Figure 15:
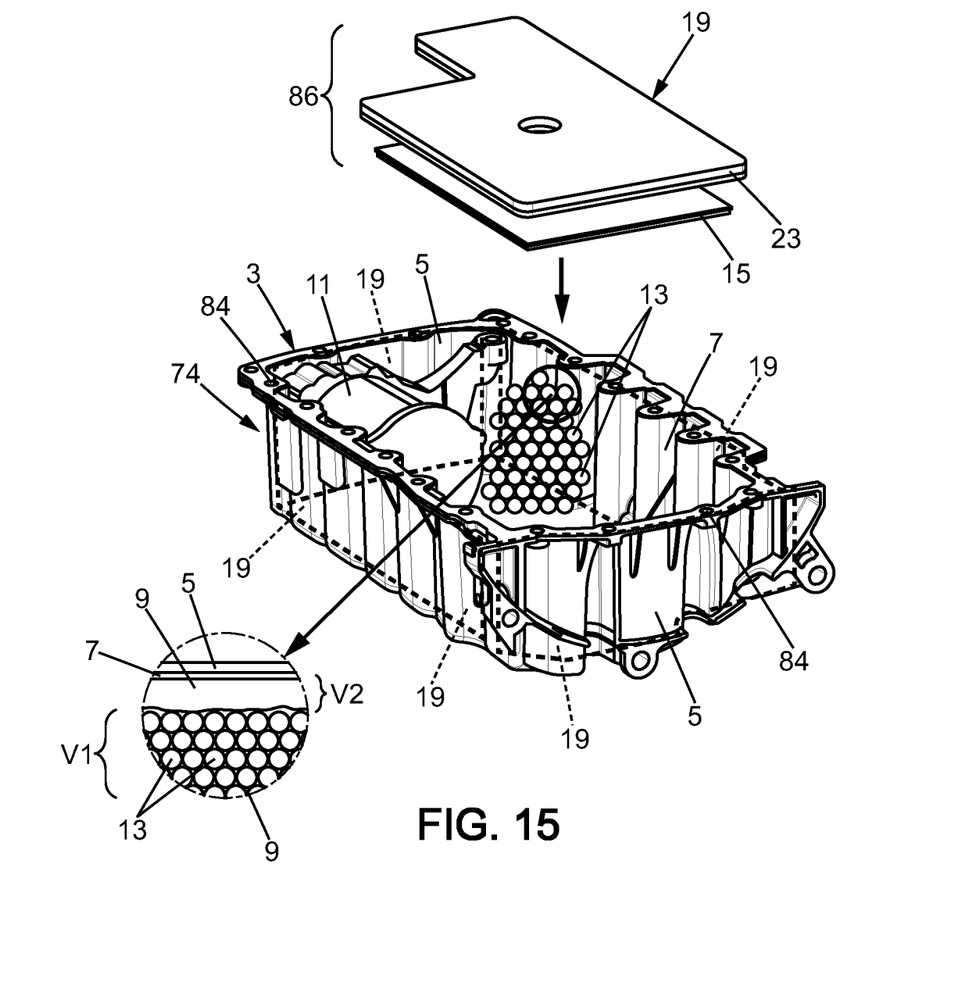

In the third assembly, as illustrated in FIG. 15, it is directly the lubricant sump 74 which defines a modular block 3. Thus, the peripheral walls 5 would integrate all or some of the layers 15/23 enveloped a priori in the aforementioned pockets 19, in the version thereof with metal walls, manually under ambient pressure. An alternative with walls 5 lined by all or some of said layers 15/23 in said version with metal walls is also possible.

Said sump 74 can as previously be screwed to the engine block, under same, and the lubricant may of course circulate therein, a pump 11 providing said circulation and an inlet/outlet connection of the lubricant provided.

Above, between the insulated sump 74 and the base of the engine block 720, a cover 86 may be arranged/interposed.

The interior of the volume 7 in said version must be imagined as same also referenced 7 in FIG. 14.

Providing a vehicle lubricant tank according to one of the last two versions above, that can therefore be used to heat the lubricant when the outside temperature is cold, for example −5 to 10° C., and when the vehicle is stopped at said temperature for, for example, 6 to 8 hours was a challenge.

The solutions in FIGS. 13-15 will make it possible here to overcome same.

Indeed, the goal has been achieved if compared to existing sumps, it was possible in said versions to increase the internal volume of the sump 74 for example by 20 to 40% (typically V1=2.5 to 4 L and V2=1 to 2 L), with:

in the lubricant sump 74 and circulation of lubricant stopped, said elements 13 that are immersed in a first volume of lubricant (V1) outside (here above) of which therefore extends a second volume of lubricant (V2) lower than the first volume, this without necessarily baffles 12 in the volume V1 filled with said elements 13, and with the strict thermal management provided by the compound 15/23 under vacuum.

In practice, it will then be possible to provide that, during a motor start, the PCM(s) of said elements 13 are then still hot: same will have retained the latent heat from the end of the preceding operation of the engine block provided with said lubricant sump. The first volume of lubricant (V1) will therefore be hotter than the second (V2), by heat exchange with the elements 13 being immersed inside.

The external volume of lubricant (V2) being lower than the first volume (V1), it has been possible to make multiplication and extension of the PCM/fluid exchange areas unnecessary; hence the proposed absence of baffles 12 in FIGS. 14, 15.

In this way, at the start of a new cycle (after the aforementioned stop due to cold weather), by gradual mixing via the circulation in the circuit, the total lubricant in circulation (V1+V2) may be rapidly globally hot, with advantages in terms of efficiency of the engine to be lubricated and limitation of pollutants.

The invention claimed is:

1. A modular block for a unit adapted to store thermal energy, the modular block comprising:
    a bottom wall; and
    lateral walls comprising a mouldable material and joined to the bottom wall, the bottom wall and the lateral walls defining a chamber and separating said chamber from an outside environment,
    wherein the chamber:
        is closed on a bottom side by the bottom wall and open on a top side opposite the bottom side,
        encloses a volume in which are disposed first thermal management elements for storing and releasing thermal energy, and
        has at least one communication passage between the outside environment and the chamber to allow a refrigerating fluid or a heat-transfer fluid in heat exchange relationship with said first thermal management elements to pass into and out of the chamber, and
    wherein:
        the modular block further comprises second thermal management elements arranged laterally around the lateral walls or included in the mouldable material of the lateral walls for the thermal management of the chamber, the second thermal management elements comprising a thermally insulating material arranged in hermetic pockets that are under a partial vacuum or filled with a gas having a thermal conductivity lower than 26 mW/m·K, and
        each of the first thermal management elements are separated from each of the second thermal management elements by at least a part of the mouldable material of the lateral walls.

2. The modular block according to claim 1, further comprising a sealing surface surrounding said top side for providing sealing in relation to the refrigerating fluid or the heat-transfer fluid.

3. The modular block according to claim 1, wherein the hermetic pockets include a series of said hermetic pockets jointed by flexible intermediate portions between two successive hermetic pockets to allow articulation of the two successive hermetic pockets relative to each other.

4. The modular block according to claim 1, wherein said first thermal management elements are arranged in said chamber such that circulation spaces for the refrigerating fluid or the heat-transfer fluid remain between the first thermal management elements.

5. The modular block according to claim 1, wherein said first thermal management elements are arranged in said chamber in a patternless manner.

* * * * *